Nov. 27, 1945.                    F. HOFBAUER                    2,389,909
                                ROTARY CUTTING TOOL
                        Filed Jan. 17, 1944         2 Sheets-Sheet 1
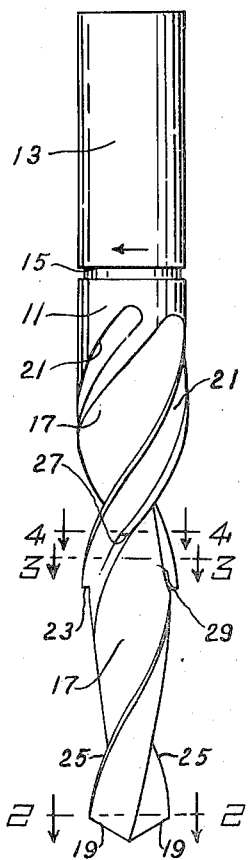
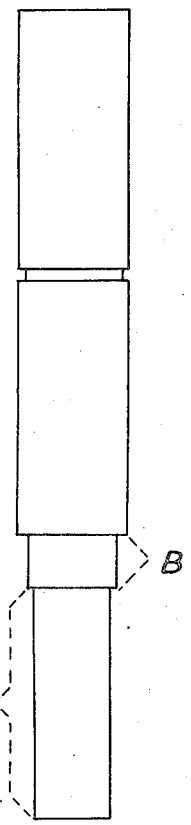
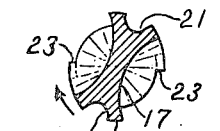
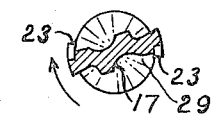
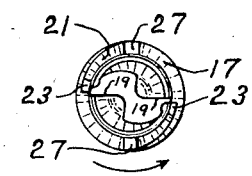
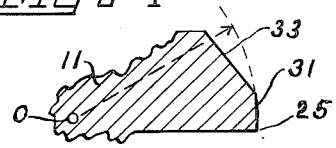
INVENTOR.
FRANK HOFBAUER
BY F. T. Hicks
HIS ATTORNEY Nov. 27, 1945. F. HOFBAUER 2,389,909
ROTARY CUTTING TOOL
Filed Jan. 17, 1944 2 Sheets-Sheet 2
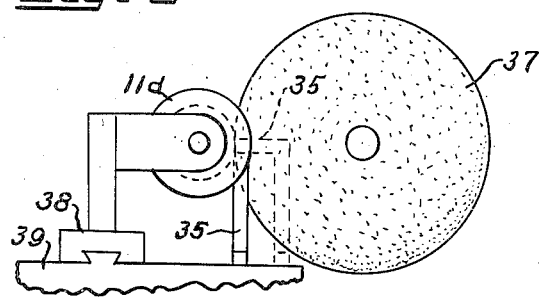
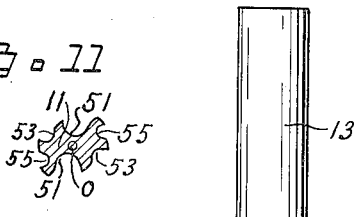
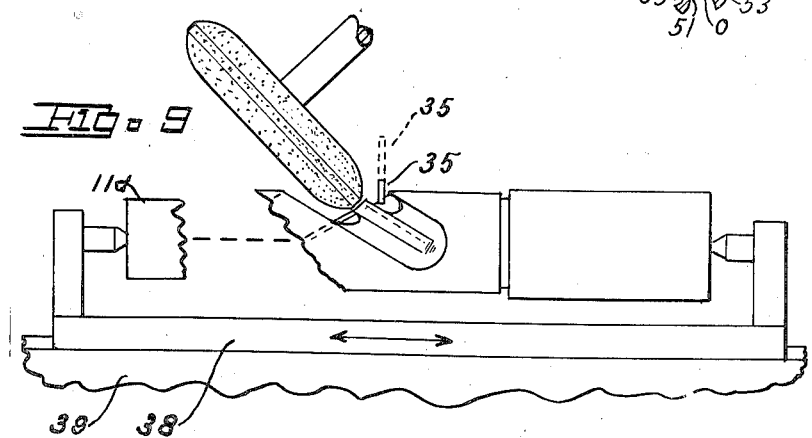
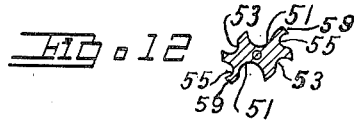
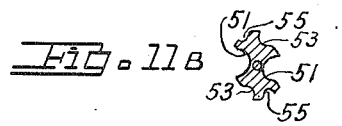
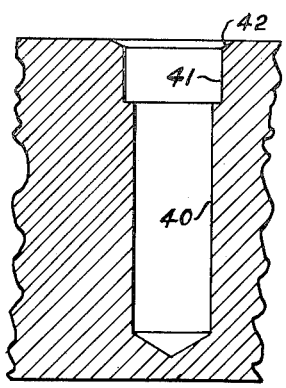
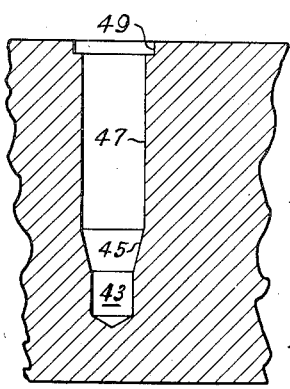
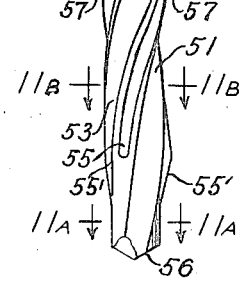
INVENTOR
FRANK HOFBAUER
BY
F. V. Hicks
ATTORNEY Patented Nov. 27, 1945

2,389,909

UNITED STATES PATENT OFFICE 2,389,909

ROTARY CUTTING TOOL

Frank Hofbauer, Detroit, Mich.

Application January 17, 1944, Serial No. 518,561

2 Claims. (Cl. 77—65)

My invention pertains to rotatable chip cutting tools for making and/or modifying variously conformed recesses in metals and other materials. This application is a continuation in part of my copending patent application Serial No. 481,951 filed April 5, 1943, now abandoned.

It is an object of my invention to provide improved composite tools for performing a plurality of operations such as drilling, reaming, counter-boring, chamfering, counter-sinking and the like, in forming or modifying apertures in various materials.

It is also an object of my invention to provide such tools having substantially improved durability and longer life than it has been previously possible to provide in such tools, especially when operating at high cutting speeds.

It is a further object of my invention to provide such a tool having the various flutes, lands and cutting edges disposed in an accurate concentric relation which is permanent in dimensions and which maintains its accuracy for the full length and life of the tool.

Another object of my invention is to provide such a tool wherein the cutting and leading edges are followed by surfaces of improved conformation and accuracy maintaining permanence of dimensions throughout the long life of the tool as well as effectively guiding and piloting the operation of the tool when working.

Also it is an object of my invention to provide such improved features in a solid center tool body wherein ample space may be provided for chip clearance and for the circulation of coolant or cutting fluids without the necessity for applying such fluids under high pressures, while also providing in such a tool ample strength for high speed operation.

Another object of my invention is to provide an improved method for making such tools.

Further objects and advantages are within the scope of my invention such as relate to the arrangement, operation and function of the various improved features and details of construction and to accuracy and economies of manufacture and to numerous other features as will be apparent from a consideration of the specification in conjunction with the drawings disclosing a form of my invention, in which:

Fig. 1 is a side elevational view of my improved composite rotary chip cutting tool;

Figs. 2, 3 and 4 are cross-sectional views taken on lines 2—2; 3—3; and 4—4 respectively on Fig. 1;

Fig. 5 is a diagrammatic view explaining the construction or manufacture of the tool;

Fig. 6 is a plan or end elevational view of the tool viewed from the cutting end;

Fig. 7 is an enlarged fragmentary cross-sectional view for illustrating the conformation of the surfaces following a leading edge;

Fig. 8 is an end elevational view, partially diagrammatic, showing how following surfaces are formed;

Fig. 9 is a plan view corresponding to Fig. 8;

Fig. 10 is a side elevational view showing another modification of the tool for forming recesses of a different conformation;

Figs. 11, 11A, and 11B are cross-sectional views on lines 11—11, 11A—11A and 11—11B respectively in Fig. 10;

Fig. 12 is a cross-sectional view corresponding to Fig. 11 but showing another modification of the tool for forming a differently shaped aperture;

Figs. 13 and 14 are sectional views taken axially through apertures, showing the different conformations produced by the tools of Figs. 1 and 10, respectively.

Referring more specifically to Figs. 1 through 7 of the drawings, my improved rotary chip cutting tool comprises an elongated body 11 of a substantially cylindrical conformation having a shank 13 extending from one end for conveniently supporting and rotating the tool in a chuck. The shank portion 13 may be separated from the body by a neck or shallow annular groove 15.

A pair of large or deep flutes 17 are cut into the peripheral surface of the body 11 in a helical fashion and open through the end remote from the shank. The open ends of the deep flutes 17 provide cutting edges 19 and the flutes provide ample space for chip clearance and for circulation of a lubricant or coolant without the necessity of applying such liquids under high pressure. Although two of these deep flutes 17 are shown in the specific embodiment of the invention illustrated, it is to be understood that any desired number may be utilized for various operating conditions, different materials, and the like.

Shallow flutes 21 are provided in the spaces or land areas between the deep flutes 17, thus forming two lands in each land area between the deep flutes. The shallow flutes 21 extend down from the portion of the tool body adjacent the shank and terminate at a point on the intermediate portion of the tool body. As shown in Fig. 1, the shallow flutes 21 may be terminated on a mid-portion of the body 11, in such a manner that cut-off or terminal ends of the sidewalls thereof form laterally projecting shoulders or steps 23 presenting cutting edges of successively greater cutting sweep or radius. This may be accomplished by turning down the tool body 11 from the cutting end back to the point where the sidewalls of the shallow flutes 21 are to be terminated, reducing the tool body to a smaller diameter which is substantially equal to the diameter through the bottom of the shallow flutes. The outer land surfaces following each leading edge are accurately formed to a particular shape, as will be subsequently described. Two edges 25 are provided extending back helically from the cutting end of the tool to the cut-off ends 23 of the shallow flute sidewalls.

In this modification one of the cut-back sidewalls of each shallow flute 21 may be cut back still further toward the shank end of the tool body so that the two laterally projecting shoulders and cutting edges 23 and 27 presented by each pair of such cut-back sidewalls are disposed in an axially stepped relation along the tool body. And either before or after the above mentioned operation, the outer surface of the longer one 23 of each pair of cut-back flute sidewalls is ground or turned down toward the center or axis of the tool body so that it has a cutting sweep or radius less than the radius of the shorter one 27 of each pair of the cut-back sidewall ends, so it extends as a sub-land above 27 while being exposed as a cutting edge therebelow.

Fig. 5 diagrammatically represents how a cut A may be turned back from the cutting end of the tool to terminate the shallow flute 21 sidewalls, and in cutting these off forming steps or shoulders 23 having laterally projecting cutting edges on an intermediate portion of the tool body. One of the cut-back ends 27 of each pair of shallow flute sidewalls being cut back still further, the other or longer one 23 of each pair is turned down to a smaller radius or cutting sweep, as in the zone represented as B in Fig. 5. The lagging sidewall of each large flute may be cut out and merged into the leading sidewall of the adjacent shallow flute, adjacent the laterally projecting shoulders. This provides additional chip clearance and lubricant or coolant space 29. To provide suitable strength and rigidity of the tool, the thickness through the web of the tool is suitably selected.

As represented in Fig. 7, the leading edges 25 are followed by an outer surface 31, which is substantially cylindrical about the central axis "o" of the tool body. This portion of the following surfaces, on the exposed lands, is formed by circle grinding on any suitable grinding machine. In accordance with my invention, the sub-lands i. e. lands of lesser radius passing between lands of greater radius, are also ground to a similar conformation. The sub-land above 23, for example, has a radius smaller than the land above 27, and this sub-land (above 23) is also circle ground. The following surfaces, still further back, are "backed-off" and relieved, as indicated at 33 in Fig. 7. This relation of the circle ground surface 31, and "backed-off" surface 33, is provided throughout the length of each land following the advanced or leading edge of each land, including the portions extending between lands of greater radius, and this may be accomplished in any suitable manner. For example, this may be done on a universal cutter grinder machine and the operation is made possible by the well-known principle of "spiral" grinding on a fixed finger 35 which turns and holds the axially advancing tool 11 in proper relation to the grinding wheel 37, as represented in diagrammatic Figs. 8 and 9, the tool 11d being rotatively supported between centers on a carriage 38 which is slidably movable along an accurate straight line, on any suitable base 39, in a well known manner. For "backing-off" the land the stationary finger 35 is supported vertically from the base and inserted into a flute of the tool for properly positioning the tool as it axially advances and rotates adjacent the grinding wheel 37, as represented in Fig. 8. For the circle grinding the advanced portion of the land adjacent the leading edge, the stationary finger 35 is mounted horizontally, shown dotted in Fig. 8, for insertion into a flute of the tool for properly positioning it as it is advanced axially in engagement with the grinding wheel, as represented in Fig. 9. Greater accuracy of conformation of the land surfaces is obtained by first "backing-off" the land and then circle grinding the portion adjacent and following the leading edge, and my tools so produced have substantially longer life and are more permanent in dimensions and more accurate in operation.

In the operation of this tool, the cutting edges 19 on the end of the tool enter a work piece or aperture therein to be formed, or modified, and the laterally projecting cutting edges 23 and 27, which are spaced axially along the tool, successively engage the material to be worked. First the steps 23 of smaller radius engage the material to be worked and then the steps 27 of larger radius become successively effective, as the tool is advanced into the work. The accurately conformed circle ground and relieved surfaces smoothly guide the operations of the tool. The arrangement of the flutes provides ample space for chip clearance and also for the application of lubricant or coolant to the point of the tool without the necessity of applying through a central aperture from high pressure apparatus. As a result of this formation continued on the sub-lands, effective cutting edges are provided for the full length and life of the tool, and greatly prolonged tool life is obtained.

The shape of the cutting edges and the flutes may be varied in accordance with the physical characteristics of the metal, plastic composition or other material to be worked by the tool. Also the third step may for example be shaped to serve as a counter-bore or chamfer, or for other purposes. Various examples of different modifications of improved tools embodying such improved features are shown in Figs. 10 through 14.

As shown in Fig. 13, the recess 40 formed by the tool shown in Fig. 1, is provided with an enlarged counter-bore 41 at the upper end. This is formed by the cutting edges 23 of greater radius entering the material. As the cutting edges 27, of a still greater radius, enter the material, the upper edges 42 of the enlarged counter-bore are modified and chamfered. This is accomplished by the edges 27 being inclined at the desired angle, instead of being at right angles to the axis of the tool. With the largest cutting edges 23 made square, the modification of the upper edges of the counter-bore 41 would of course be to start another counter-bore of still larger diameter, as will be understood.

Figs. 10, 11, 11A and 11B show a modified multi-combination tool which drills, machines tapered hole, reams and counter-bores to form a recess, as shown in Fig. 14, wherein the portion 43 is drilled, 45 is tapered and portions 47 and 49 are reamed counter-bored respectively to successively larger diameters. It will be understood that the hole may be pierced completely through the work. The tool is provided with two large deep flutes 51 and disposed therebetween are two pairs of small shallow flutes 53 and 55, making a total of four of the latter between the two large flutes. Small flutes 55 are shallower than the small flutes 53. The shallow flutes designated 53 are leading and the foreward edges or lands thereof are cut down to the minimum diameter of cutting edge desired where these are continued through into the cutting point 56 of the tool and suitably conformed for drilling. Throughout the length of the tool the leading lands of flutes 53 are circle ground on the forward portions, after being first relieved on the back portion, as previously set forth, for providing improved accuracy and permanence of dimensions. The rear edge or land of the two lagging shallow flutes 55, together with the intermediate lands between both pairs of shallow flutes, are cut down and tapered suitably at the lower portion, the foreward land of flute 55 forming taper-boring edges 55'. Above the taper, the lands intermediate the shallow flutes 53 and 55, are of a suitable radius for reaming portion 47 of the aperture, and on this portion of the tool the back land of the lagging flute 55 is cut down to a smaller radius up to the point where the counter-bore 49 is desired, where it increases in a sharp shoulder or cutting edge 57. Throughout the operative length of the tool, the lands which continue to the maximum radius, as well as those lands or portions of lands which extend in overlapping relation as sub-lands, are prepared by relieving the back portions of the outer surfaces and then circle grinding the leading portions, in the manner previously described. This provides an accurate concentric relation which is permanent in dimensions and maintains its accuracy through the full length and life of the tool as it is ground back and resharpened.

Fig. 12 is a cross-sectional view, corresponding to Fig. 11, but showing a modified cross-section wherein the back land of the lagging shallow flute 55 has the outer surface suitably conformed to provide a perpetual over-head pilot 59, to run in an over-head bushing. For this purpose the outer surface of the back land of flute 55 is made of a circle ground conformation all the way from the front or leading edge to the rear edge.

It is apparent that within the scope of my invention modifications and different arrangements may be made other than herein disclosed, and the present disclosure is illustrative merely, the invention comprehending variations thereof.

I claim:

1. In a composite rotary chip tool, an elongated body of substantially a stepped cylindrical conformation, a supporting and rotating shank extending from one end of said body, four chip receiving flutes alternating shallow and deep and extending helically in the peripheral surface of said body, two oppositely disposed dividing walls between two of the flutes being terminated so as to form a pair of laterally projecting steps with cutting edges at diametrically opposite points on an intermediate portion of the tool body, and two other dividing walls between two of the chip receiving flutes being so terminated as to provide steps presenting a second pair of cutting edges of smaller sweep or radius projecting laterally at diametrically opposite points spaced axially toward the cutting end of the tool body from the first mentioned cutting edges so that the second mentioned cutting edges are engaged before the first mentioned cutting edges as the rotating tool is passed into an aperture to be formed or modified.

2. A rotary chip cutting tool comprising, an elongated substantially cylindrical body having a shank portion at one end and a bit portion at the other end, said bit portion having a pair of oppositely disposed deep flutes formed helically throughout the length of said bit portion, thereby providing two oppositely disposed helical land areas between said deep flutes, and a plurality of shallow chip receiving flutes formed in each land area between said deep flutes, thereby dividing each land area into at least three lands, the leading one of said lands in each land area extending throughout the entire length of said bit portion of said tool and having a leading edge of a predetermined diameter formed throughout its length, the second land in each land area extending from said shank portion towards the end of said bit portion and being terminated at an intermediate point on said bit portion and having a leading edge formed throughout its length of a diameter greater than the diameter of said leading land, a third land of each land area extending from said shank portion and terminating further back from the end of said bit portion than said second land and being provided with a leading edge throughout its length of a greater diameter than said second land, all the lands having curved outer surfaces following the leading edges, and said curved outer surfaces being formed concentric to the axis of the tool and extending throughout the lengths of all the lands including the portions of the lands of smaller diameter where they pass between lands of greater diameter in order that these portions of smaller diameter are also ready for use when exposed by grinding back the tool.

FRANK HOFBAUER.